United States Patent [19]

Cook et al.

[11] Patent Number: 5,077,788

[45] Date of Patent: Dec. 31, 1991

[54] SYSTEM AND METHOD FOR PROCESSING TELEPHONE COMMUNICATION

[75] Inventors: Joseph C. Cook, New Braunfels; Bill D. Lavoie, Athens, both of Tex.

[73] Assignee: Taro, Inc., Houston, Tex.

[21] Appl. No.: 591,670

[22] Filed: Sep. 28, 1990

Related U.S. Application Data

[63] Continuation of Ser. No. 377,441, Jul. 6, 1989, abandoned.

[51] Int. Cl.⁵ .................... H04M 1/57; H04M 3/50
[52] U.S. Cl. .................................. 379/142; 379/32; 379/45; 379/96; 379/214
[58] Field of Search ............... 379/45, 269, 201, 207, 379/214, 247, 245, 94, 96, 97, 88, 67, 142, 32

[56] References Cited

U.S. PATENT DOCUMENTS

| | | | |
|---|---|---|---|
| 3,920,908 | 11/1975 | Kraus | 379/91 |
| 4,656,623 | 4/1987 | Dalby, Jr. et al. | 370/60 |
| 4,785,408 | 11/1988 | Britton et al. | 364/513.5 |
| 4,800,583 | 1/1989 | Theis | 379/67 |
| 4,805,207 | 2/1989 | McNutt et al. | 379/89 |
| 4,893,325 | 1/1990 | Paukonen et al. | 379/45 |

FOREIGN PATENT DOCUMENTS

| | | | |
|---|---|---|---|
| 2158278 | 10/1979 | Fed. Rep. of Germany | 379/45 |
| 0299659 | 12/1988 | Japan | 379/45 |

Primary Examiner—Thomas W. Brown
Attorney, Agent, or Firm—Browning, Bushman, Anderson & Brookhart

[57] ABSTRACT

Disclosed are a system and method for processing telephone calls for special services, such as emergency service calls. One or more answering station units may receive calls through a telephone network. The number of the calling station is automatically identified and used to seek calling station location information in a computer memory forming part of the answering station unit. The call is then conferenced with an agency station associated with the services needed, and the location information is dispatched to the agency station. Each service answering station unit is a stand-alone unit.

4 Claims, 4 Drawing Sheets

SYSTEM AND METHOD FOR PROCESSING TELEPHONE COMMUNICATION

This is a continuation of co-pending U.S. application Ser. No. 07/377,441 filed on July 6, 1989, now abandoned.

BACKGROUND OF THE INVENTION

1. Field of the Invention

The present invention pertains to techniques for processing telephone communication. More particularly, the present invention relates to methods and systems for receiving, and responding to, telephone requests for special services, and is particularly applicable to emergency service systems commonly known as 911 systems.

2. Description of Prior Art

Emergency telephone call systems are being deployed generally throughout the United States in increasing numbers. These systems have, in general, adopted a dialing code of 911, and are commonly known as 911 systems. The features of the 911 systems vary, depending generally on their age and the sizes of the communities being served. The earliest systems simply routed callers who dialed the emergency code to a central answering point where an operator took the call and, through conversation with the caller, determined which emergency service or agency was needed, for example, medical service, the fire department, the police department, etc. The operator then connected the caller to the proper emergency service agency. Later systems included additional features, such as automatic calling number identification, the capability for the operator to place the call on hold, forced disconnecting of the call and re-establishment of the call in the event the call was interrupted or abandoned by the caller. The latest systems include the capability of automatic location identification, that is, the automatic use of the identified caller number to search a central computer memory and retrieve information pertinent to the caller.

Most emergency telephone call systems are designed for very large metropolitan areas, and are very expensive. Larger municipalities are now utilizing second generation systems with multiple call operators as well as the current level of enhancements available. Smaller communities have also deployed systems, but not to the same extent as larger cities due to the cost efficiency differences. For example, many of the smaller systems do not employ automatic caller number identification, or any other enhancements. Many rural areas, as well as non-metropolitan sectors, do not have 911 emergency service. Only within the past few years has a system with enhanced features but designed to accommodate the needs of a smaller community been deployed. This system is micro-computer based, and is interfaced to the telephone network by an automatic caller number identification system as disclosed in U.S. Pat. No. 4,754,475.

In general, specialty service systems, such as 911 systems, that include enhanced features are computer-based, utilizing a central computer system. While such systems may provide extensive computer capacity, capable of serving large communities, they are not particularly cost-efficient for smaller communities. Further, even though such systems may feature multiple operators responding to the emergency service calls, the operators are generally centrally located with the computer system. Further, all operator stations are put out of commission whenever the computer is disabled, or is shut down for purposes of updating the data base of the computer memory, for example.

The present invention provides a telephone special service call processing system and method which is capable of serving virtually any size community without loss of efficiency. Further, the present invention provides additional flexibility in that the answering operators may be located virtually anywhere, at different sites, including at one or more of the agencies providing the various services. Additionally, each operator station is a stand-alone facility which may contain a complete data base so that if one such station is disabled, the remaining stations continue operable. Finally, the present invention may be readily expanded, with the addition of new answering facilities, and remains relatively cost-efficient.

SUMMARY OF THE INVENTION

The present invention provides method and apparatus for processing special service telephone calls, received from caller stations by way of a telephone network having a central control or office. A service answering station comprises one or more answering terminals, or units, each equipped with a computer and a telephone instrument. One or more service providing agency stations is each equipped with a telephone instrument and an output device. Additionally, each computer of the answering station has a memory unit for storing information. An automatic number identification device is provided, either as a part of the answering station units or as part of the telephone network. The number of the caller station identified by the number identification device may be used to identify and retrieve information in an answering terminal memory unit. Each of the agency stations may also include a computer as a part thereof.

With a plurality of answering units making up an answering station, one or more of the answering units may be remotely located relative to the other answering units. Additionally, the memory units of the answering terminals may be linked for intercommunication therebetween. The answering units may also include input devices for introducing data into the computer memory units. The answering units may also include output devices for selectively outputting information from the computer units. For example, the output devices may comprise printers.

In a method of the invention, a call from a caller station is received at a central control and directed to an answering station unit. The call is recognized as a service request call and the number of the caller station is automatically identified. The number is then utilized to search and retrieve data in the memory unit relative to the caller station. An operator using the telephone instrument at the answering unit initiates communication to an agency station, and incorporates the agency station in the call. Information from the answering unit memory unit concerning the caller station is dispatched to the agency station. Data dispatched to the agency station may be there printed out, along with logging information. Logging information may also be printed out at the answering station. Updated information may also be obtained from the caller station at the answering station for incorporation in the memory units of the answering station. Data may be updated in the answering station unit memories by introducing such information into the memory unit of one such answering station unit, from which the information may then be conveyed to the other answering unit memory units.

Each of the answering station units is a stand-alone unit. Where several such units are included in an answering station, whether located at the same site or remotely located relative to each other, a routing switch may be included either at the telephone network or at an answering station location for routing calls from caller stations to the various answering station units.

DESCRIPTION OF PREFERRED EMBODIMENTS

Figure 1:
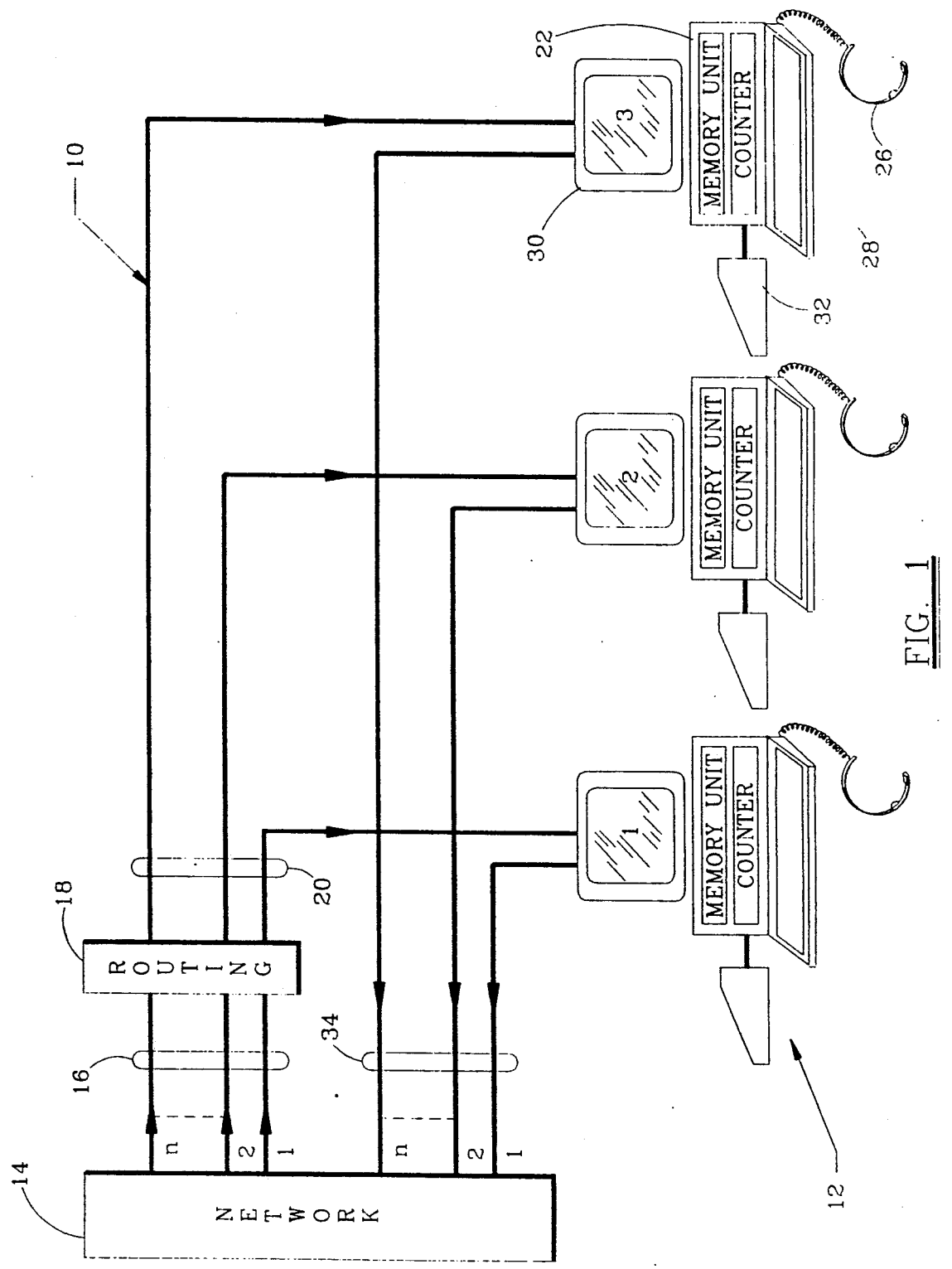
FIG. 1 is a schematic representation of an answering station according to the present invention.

An answering station for processing telephone communications according to the present invention is shown generally at 10 in FIG. 1. As illustrated, the answering station 10 includes a plurality of answering terminals, or units, shown generally at 12; units 1, 2 and n are illustrated to indicate that an indefinite number of units are included in the station 10. An answering station may include any number of answering units, even just one.

The answering station 10 is connected to a telephone network 14, which may include a central office or control, by trunk lines 16 dedicated to receiving telephone calls specifically for the services which the answering station 10 is intended to control. For example, answering station 10 may control the dispatching of emergency services in what is commonly referred to as a 911 system, that is, a system which a caller station may enter by simply dialing 911. The trunk line 16 may thus be referred to as 911 trunk lines. For purposes of discussion and illustration, rather than limitation, the present invention will generally be described in terms of a 911 system, although the present invention applies to any type of system which may be used to provide special services by way of telephone communication.

The trunk lines 16 are received in a routing switch 18, which is connected to each of the answering station units 12 by individual trunk lines 20. The purpose of the routing switch is to direct each 911 call from a caller station to one or the other of the n answering station units 12 which is available. The routing switch 18 may be located so as to effectively be part of the telephone network 14, or may be located at a site of the answering station 10, or at some intermediate position. Additionally, the various answering station units 12 may be mutually remotely located as discussed more fully below. In any event, the routing switch 18 may be located at virtually any position relative to the answering station units 12.

If more than one answering station unit 12 is utilized, the multiple answering station units may each be constructed in the same fashion, including the same kind of equipment, or there may be variations among the answering station units. The several answering station units illustrated in FIG. 1 are shown to include the same equipment, and the nth answering station only, indicated by 22, will be described in detail herein.

The answering unit 22 includes a computer, or microprocessor, 24, which may be of virtually any type. In general, a personal computer (PC) may be utilized as the computer 24 for an answering unit. Included within the computer 24 is a memory unit appropriately chosen to include whatever capacity is needed to store information, as discussed in more detail hereinafter, to appropriately serve the community intended to be served by the system. In addition to a computer 24, the answering unit 22 includes a telephone instrument 26, illustrated as a head set connected to the computer 24 in which is included the receiver and an appropriate modem for connecting the computer to the telephone network 14. Thus, an incoming call directed to the answering unit 22 may be appropriately received by the computer 24, equipped with the telephone instrument, and wherein a telephone operator may converse with the caller station by means of the head set 26 and the remainder of the telephone instrument and modem included within the computer unit 24.

An optional input device, such as a keyboard 28, may be included in an answering unit for inputting instructions and information into the computer 24 and its memory. A cathode ray tube (CRT) display 30 may be included in an answering unit as one form of output device by which information, contained within the computer memory unit, may be obtained by the operator. A permanent hard copy output device, such as a printer 32, may be included in an answering unit as an optional component.

Each answering unit 12 is connected back to the network 14 by a local trunk line 34. It will be observed that the 911 trunk lines 16, the answering unit lines 20 and the local lines 34 back to the network 14 are provided in sufficient number to accommodate all of the answering units n.

Figure 2:
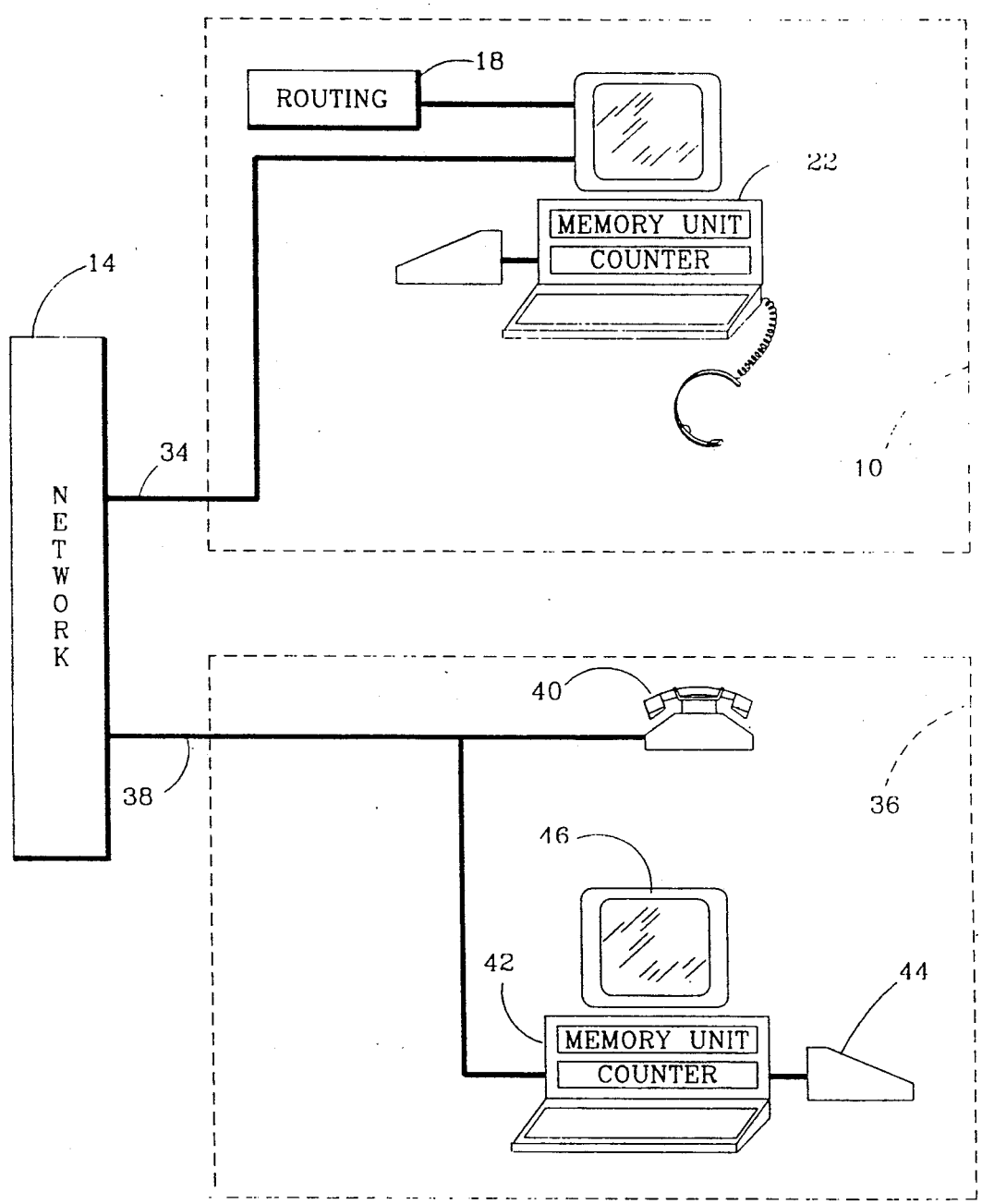
FIG. 2 is a schematic representation of an agency station linked to an answering station through a network according to the present invention.

In FIG. 2, an agency station 36 is shown connected by a trunk line 38 to a telephone network 14, to which is also connected an answering station 10 generally as described above and as illustrated in FIG. 1, with like features identified by like number labels. The agency station for a 911 emergency system would be typically related to police, fire, medical, etc. services. For example, an agency station could be located at a local police station, or at a central police station from which dispatching orders may be given. Likewise, a single agency station could be used to dispatch fire department services from a variety of locations serving the community, or a separate agency station may be located at each of several local fire department houses. Agency stations may be located in hospitals, or other facilities from which ambulance services may be dispatched. Agency stations may be appropriately located to provide other types of services. In any event, the agency stations may be remotely located as desired, and as appropriate to provide the services in question for the community.

The agency station 36 includes a telephone instrument 40, which may take any appropriate form convenient for the particular agency station, as well as for the telephone communication processing system in general. As discussed below, information from an answering terminal computer memory unit is to be dispatched to the agency station 36 and appropriately displayed for use by the operator at that location. Therefore, the agency station 36 includes a telephone interface facility 42, which may include an appropriate modem and any central processing unit, or computer, device needed whereby such information may be received and directed to one or another output device, such as a printer 44 and/or a CRT display 46. With the equipment illustrated, the agency station 36 may receive information dispatched from the memory unit of the answering station unit 22 and have such information displayed on the CRT 46 and/or hard copied on the printer 44. Additionally, with an appropriate computer capability as part of the receiving device 42, logging information, as well as a recording of the telephone conversation with the agency station 36, may be recorded, and selectively printed or otherwise output.

A telephone communication processing system according to the present invention would include at least one answering station unit for receiving and processing telephone calls. At least one agency station is provided to which appropriate information from the answering unit may be directed, and from which any appropriate service response may be dispatched. In general, a telephone call may be received from a caller station at a telephone network, and recognized as a special services call. The telephone call is directed to an answering station unit, which ascertains information about the caller station as discussed below. Based on a conversation with the caller station, the operator at the answering station unit determines the agency station for which an appropriate response, if any, is due, and incorporates that agency station in the telephone call. The information ascertained by the answering station unit which is pertinent to the caller station is dispatched to the selected agency station, which can then dispatch appropriate services in response to the initial call while the answering station unit may disconnect from the telephone call to be free to receive another call.

Figure 3:
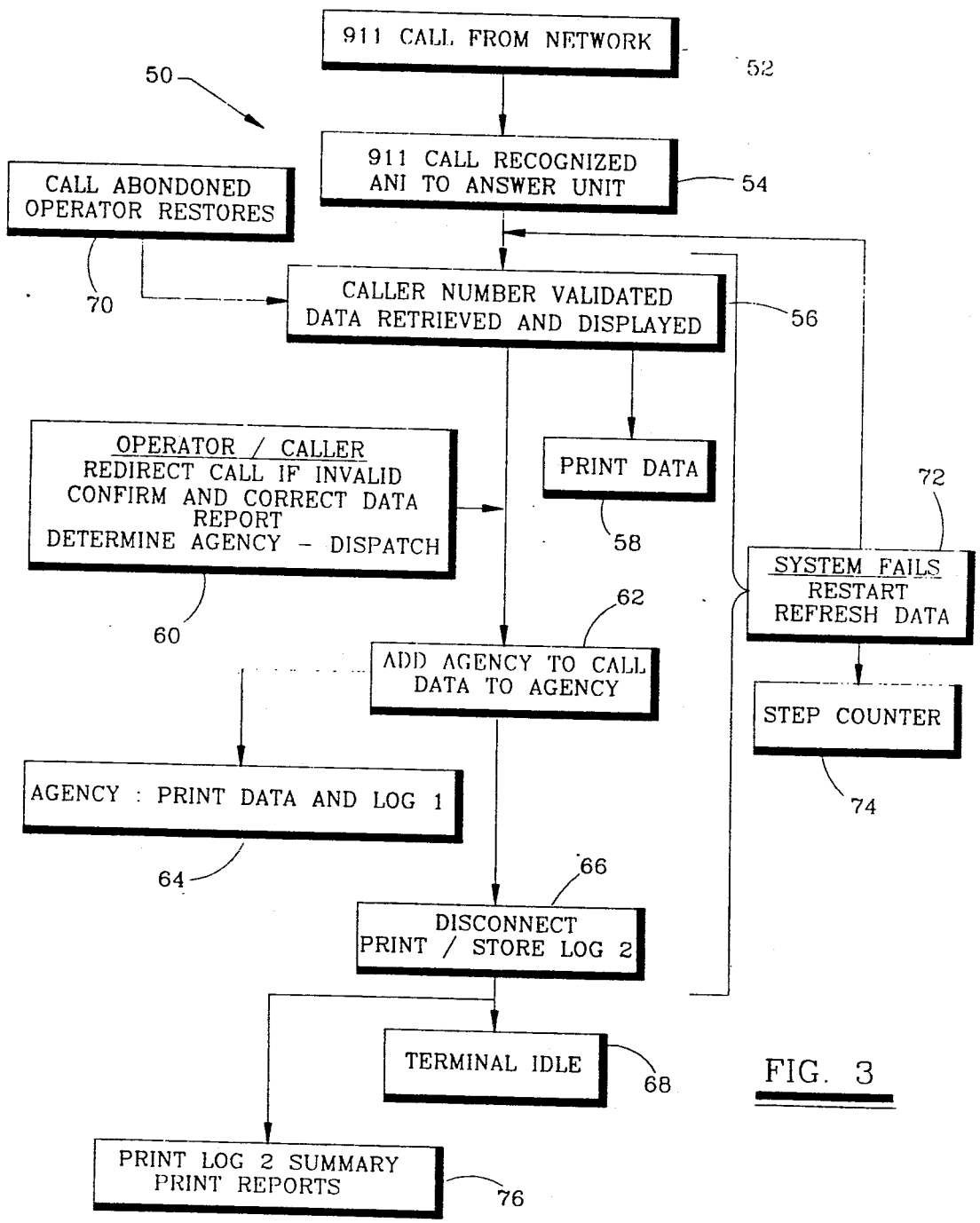
FIG. 3 is a flow diagram of method steps for processing a telephone call for special services according to the present invention.

FIG. 3 generally illustrates the operation of a telephone communication processing system according to the present invention. The operational steps are shown in a flow diagram indicated generally at 50. The sequence begins with a call initiated at a calling station, which may be a telephone instrument anywhere within the area served by the special services system. The calling station may dial a number which triggers the special services system in question, such as the 911 number which is typically used in emergency services systems. The telephone network directs the 911 call at 52 to an answering station, where it is routed to an answering station unit if the answering station includes more than one unit. At the answering station unit, the 911 call is recognized as such, and an automatic number identification (ANI) device automatically determines the number by which the caller station is identified, as indicated at 54. An ANI device may be incorporated within the answering station unit after the fashion of the detector identification device illustrated and described in U.S. Pat. No. 4,754,475. Alternatively, any other automatic number identification system may be utilized, and may even be incorporated within the telephone network itself. However, the incorporation of an ANI device within an answering station unit is preferred.

At 56, the identification number of the caller station is validated, or confirmed, by the operator, for example. The caller station identification number is used to identify information within the memory unit of the answering station unit computer. This information is relevant to the caller station itself. Typically, such information might include the address of the caller station location, a brief description of features of the building, such as the number of stories, whether the building is brick, frame, etc., whether anyone resides or works there who has a particular medical condition, such as a prior heart attack, diabetes, physical handicap, etc., whether any hazardous materials are stored or utilized on the premises, etc. Any information which may be useful or necessary to a proper response to an emergency call of any type may be stored within the memory unit of the answering station unit. This information is locatable by the memory unit based on the caller station identification number, and, having been located, is retrieved and displayed on the CRT of the answering station unit. As an option, a hard copy of this information may be printed, as indicated at 58.

At 60 it is indicated that, if the operator determines that the caller number is invalid, for example, that the caller station is in a community or location which is not served by the system of which the answering station unit is a part, the operator may redirect the call. Such call redirection may simply be back to the central office of the telephone network, or, through that network, to another exchange or network and its special services system, and even to an answering station unit in such other system. If the number is valid, the operator may confirm various information displayed from the memory unit relative to the caller station. The operator may also obtain from the caller station additional data, or correction of data in the memory unit. Such additional and/or corrected data may be input by the operator utilizing the answering unit input device (keyboard), thus making a report of such additional and/or corrected data for later incorporation into the data base of the memory unit as well as the memory units of other answering station units. Further, the operator may ascertain from the caller station the nature of the services needed, and thereby determine which agency should be contacted to provide those services.

At 62 the operator may utilize the telephone instrument and/or the computer system of the answering station unit to connect an agency station, adding the agency station to the initial telephone call. Data from the answering station unit relevant to the caller station, which data has been displayed, with its updates and/or corrections determined at 60, are dispatched to the agency station where they can be displayed, for example. Additionally, at 64, the agency station may print a hard copy of such data along with any log information (Log 1), such as the time of initiation of the call to the agency station, the time of the end of the call, any additional information obtained by the agency station from the caller station, what activity was taken by the agency station, etc.

With the appropriate agency station in contact with the caller station, the answering station unit disconnects from the telephone communication at 66, and stores similar log information (Log 2), such as the times of the beginning of the telephone communication with the answering station unit and the end of that communication, the agency station which was connected to the call, etc. This information may be stored in the answering station unit's memory unit for later use, and a hard copy of such information may also be printed. The answering station unit, or terminal, is then idle at 68. The "idle" condition is one in which the unit is not receiving information, but is available for contact by another call from a caller station.

If, during the communication between the caller station and the answering station unit, the caller station abandons the communication, the operator may restore the communication by resort to the caller station number, as indicated at 70. Then, for example, the operator at the answer station unit may, if necessary, revalidate the caller station number and obtain the relevant data from the data base of the memory unit.

If the system should fail during the communication between the caller station and the answer station unit due, for example, to an unintentional disconnect or some malfunction, the system may automatically restart the program as indicated at 72. Such restart may include an automatic reconnect between the answering unit and the caller station with attendant display of the relevant data from the data base, and even an automatic reconnect with the agency station if the process had reached stage 62. Also, the additional and/or corrected data, for example, which may have been ascertained and input to the answer unit computer by the operator at 60 may be refreshed on the display screen, for example. Depending upon where the program was at the time of the system failure, the system can automatically restart and return to that stage in the program or earlier. As indicated in FIG. 3, the restart may return to validation of the caller station identification number at 56, for example. Such a restart may trigger a counter to step, that is, to count the restart, so that a record will be made of the number of restarts as a count of the number of system failures. Such information may be pertinent to maintenance and repair of the system, for example.

As indicated at 76, at some selected time, such as the end of the work day or some other period, the answer station unit may print out a summary of its logging information, and may also print out the data base addition and/or correction reports obtained at 60. The data base reports may then be incorporated into the data base.

Figure 4:
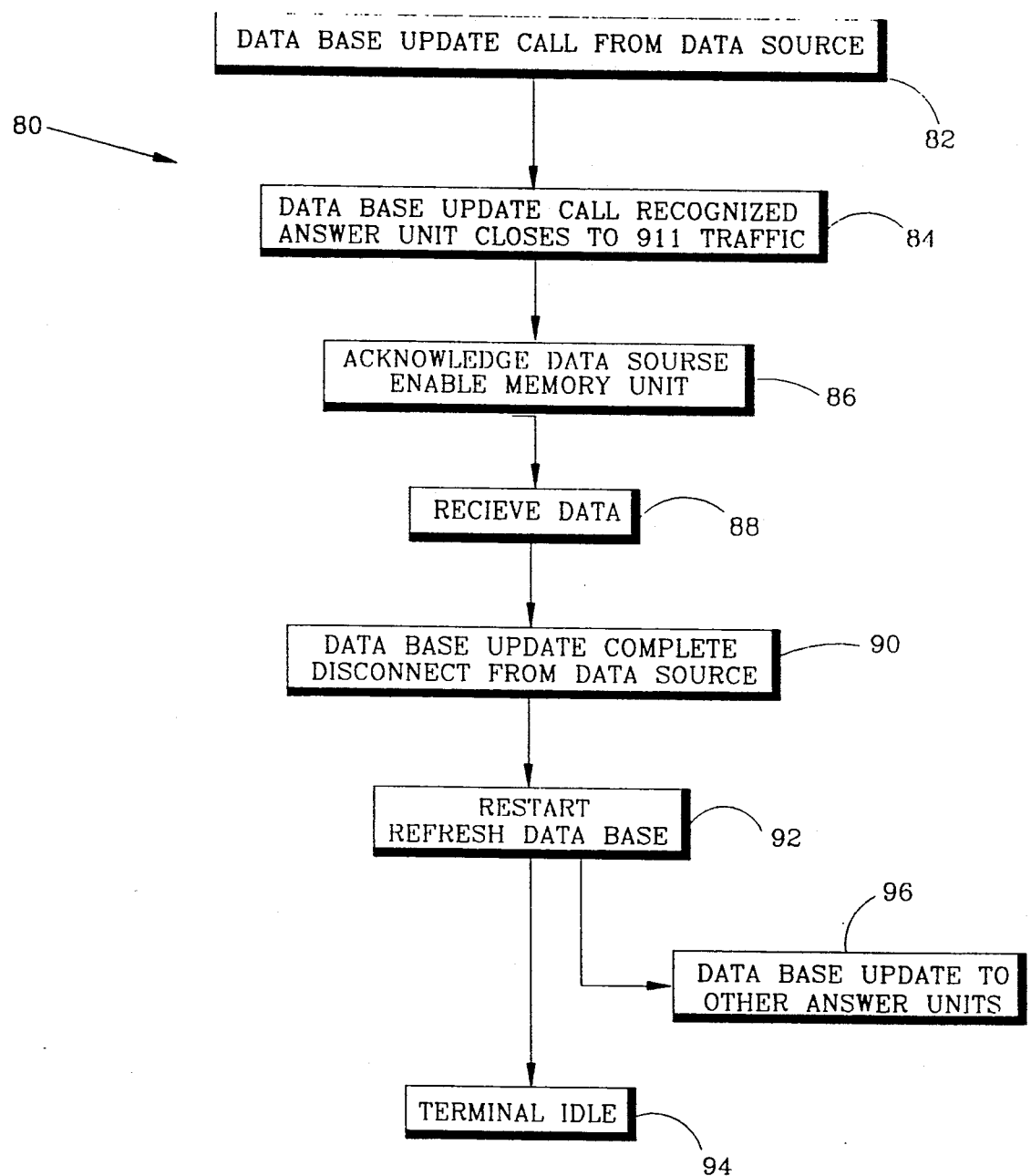
FIG. 4 is a flow diagram illustrating method steps for updating the data base of answering station memory units according to the present invention.

FIG. 4 illustrates process steps, indicated generally at 80, which may be utilized according to the invention to update the data base, for example from reports generated at 60 in the process illustrated in FIG. 3. The updating of the data base may be initiated in several ways, including from the input keyboard of the answer station unit itself. Alternatively, the data base update may be initiated from some other unit, such as a central administrative office, the telephone network central control, another answer station unit, etc. In any event, the data base update may be based on the reports from 60 in FIG. 3, or some other source of information.

The data base updates may be initiated by a call from a data source, which here is meant to identify some unit, which may be the answer station unit, or some other unit as discussed above. The call is initiated at 82 in FIG. 4, and the station unit to which the call is directed may so recognize the update call at 84. Since the answer unit is to be occupied receiving a data base update, the answer unit goes out of the idle configuration, closing itself to any incoming 911 calls. Thereafter, at 86, the answer unit acknowledges the call from the data source and enables the memory unit of its computer unit to receive incoming information. At 88, the answer unit receives the data from the data source. Thereafter, with the complete data base update report received by the answer station unit, that unit disconnects from the data source.

At 92 the computer unit of the answer station unit restarts, and updates the data base according to the data received from the source, correcting information already in the memory unit relevant to the particular caller stations, for example, for which updated data has been sent from the data source, and adding data to the data base as well.

With the memory unit of the answering station unit having had its data base updated at 92, the answer station unit reverts to the idle configuration at 94, wherein the unit is available for receiving 911 calls.

If there is more than one answering station unit, a data base update may be directed to other such units from the present unit at 96. Depending on the capabilities of the computer unit and its software, the conveyance of data base updates to other answer unit computer units may take place with the sending unit either in an idle configuration or otherwise closed to 911 traffic. In any event, the conveyance of data base updates between answer units may take place over local telephone lines through the telephone network 14 (FIG. 1) or directly from one unit to another by direct line connections (not shown). In any event, one such answer unit may convey a data base update to another answer unit, and either of those updated answer units may continue conveyance to a third unit, and so forth. Where only two answer units are incorporated in the answer station, it is preferable to be able to exchange data base updates with the sending answer unit in an idle configuration to at least receive a 911 call from a caller station. If necessary, the data base update conveyance may be interrupted while such 911 call is processed, with the data base update transfer resumed after the disconnect at 66 in FIG. 3. Further, if the answer station includes only one answer unit, it is preferred that the unit be capable of receiving and processing a data base update while remaining in an idle configuration to at least receive a 911 call. Again, such data base updating may be interrupted while the 911 call is processed, and resumed thereafter.

The present invention provides a system for processing special service telephone communications including one or more answering units, with each answering unit being a stand-alone unit having its own computer and memory and telephone interface. With at least two such units included in the system, the system features redundancy and survivability in the event of a breakdown of one of the units, for example. With expanded computer capabilities, a single computer may serve two operators at an answering unit, for example. However, multiple stand-alone units provide redundancy and back-up features. Additionally, each unit, or terminal, may have its own uninterruptable back-up power supply, such as a battery or generator, to take over powering the unit in the event of a general power failure to the answering station, for example.

Virtually any type of microprocessor computer, such as those commonly known as personal computers, for example, may be utilized in an answer unit, as well as in an agency station unit. Each answer unit features its own memory capacity sufficient to hold all relevant data associated with each active telephone caller station, or number, in the service area. The computer system of each unit may be augmented by applications software especially adapted and customized for each application. Such software looks up and displays the address of the calling station making the special services call. Further, each answering unit may be equipped with a map coordinate system which further identifies the location of the caller station to assist the operator in dispatching the special services needed. The type of memory unit included in each answer unit may vary depending upon the storage needs, and may range from a floppy disc to optical discs. Each unit may also include a "fail-safe" back-up data storer in the form of a tape or spare disc system, for example.

Numerous features and functions may be carried out automatically. For example, various reports may be automatically generated and output at selected times or on command. Such reports would include the correcting and updating of information which the answer unit operator may initiate, as well as reports on the number of restarts, summaries of logging information from the answer unit, etc. Data relevant to a caller station may be automatically dispatched to an agency station coincident with the connection of the answer unit to the agency station. The call to the agency station itself may be automatically effected upon determination by the answer unit operator as to which agency is to be notified. Other automatic functions include automatic redialing of an abandoned call, and automatic restart of the system operation in the event of temporary system failure.

A communication processing system according to the present invention may be applied across jurisdictional lines. Then, the present system may automatically reconnect the caller station with an answering station or agency station in another jurisdiction, as needed, utilizing the data base in the answering unit memory, as an alternative to the central office of the telephone network making such transfer.

While relevant location information may be retrieved from the answer unit memory unit based upon the identification number of the caller station, such information may also be retrieved utilizing the caller station customer name, the address, or some other identifying feature which may be conveyed to the answer unit from the caller station. Also, the caller may inform the answer unit operator of the need for special services at another location, whereupon the operator may input the identification of the other location into the computer, and proceed with regard to the other location as if it were the caller station. All possible telephone numbers may be stored in the memory of the answer unit; those not in service may generate an indication to that effect upon retrieval from the memory unit. The data base may be updated in several ways, including from any unit which can be tied into the computer of a given answer unit, or by the operator of an answer unit, etc.

The flexibility of the present system extends also to actual location of answering station units. Multiple answering station units may each be located at different sites, including agency station locations, for example. Alternatively, some or all of the answering station units may be located at the same site.

The foregoing disclosure and description of the invention is illustrative and explanatory thereof, and various changes in the method steps as well as in the details of the illustrated apparatus may be made within the scope of the appended claims without departing from the spirit of the invention.

What is claimed is:

1. A method for processing telephone calls, utilizing an answering station, said answering station having a telephone instrument, a computer with a display, and a memory unit, and utilizing at least one agency station to which information is to be conveyed, comprising the following steps:
   (a) connecting a caller station with an answering station;
   (b) automatically receiving the number of said caller station at said answering station;
   (c) utilizing the number of said caller station to seek a set of data stored in said memory unit which concerns the address of said caller station;
   (d) displaying said set of data obtained from said memory unit;
   (e) initiating communication to an agency station and incorporating said agency station in said call, and dispatching said set of data to said agency station; and
   (f) automatically restarting said method at step (c) after a temporary failure affecting said answering station.

2. The method of claim 1, further including the following step:
   stepping a counter in response to said restart.

3. The method of claim 1, wherein: said restart includes automatically redialing the number of said caller station.

4. The method of claim 1, wherein: said restart includes automatically redialing the number of said agency station.

* * * * *